UNITED STATES PATENT OFFICE.

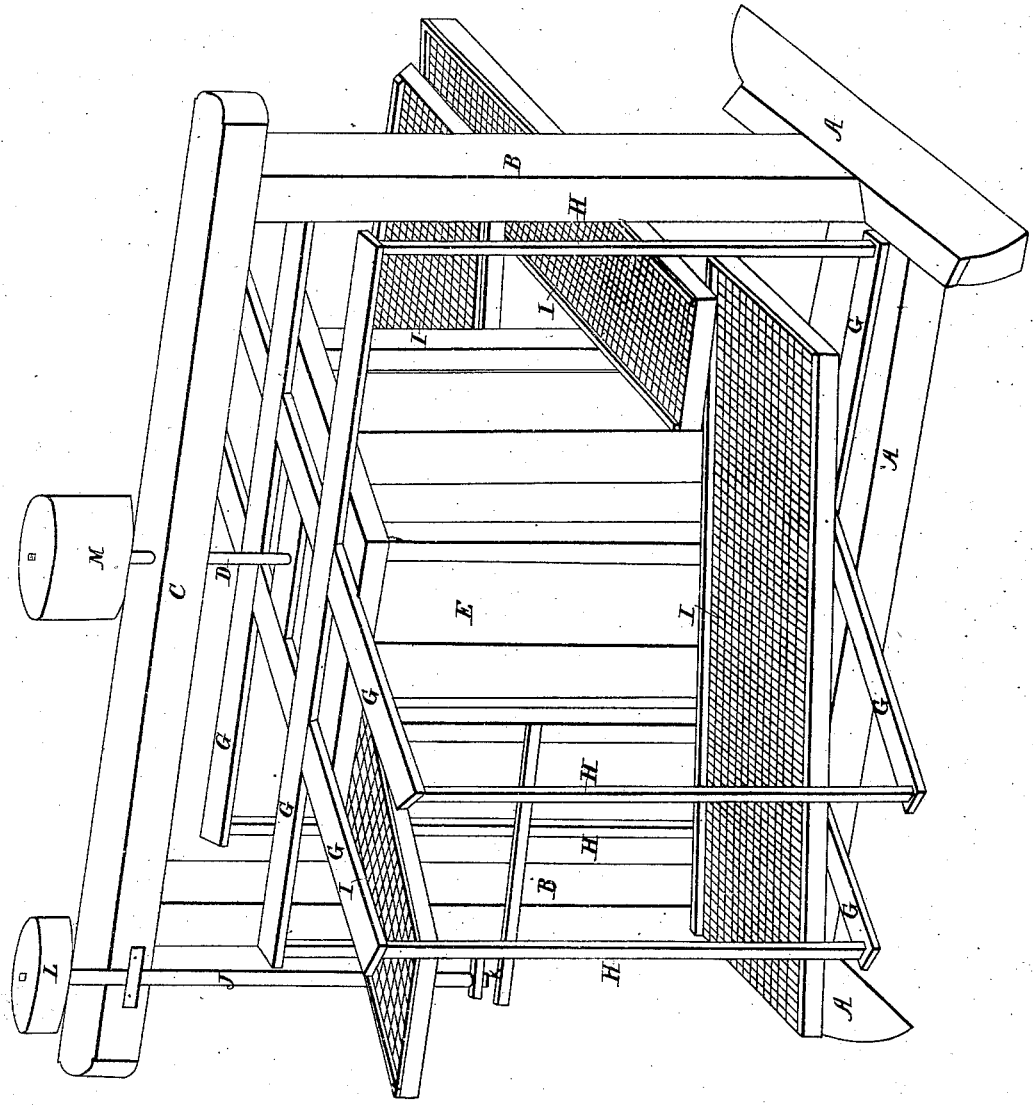

WILLIAM MOORE, OF BELLEVILLE, OHIO.

GRAIN-WINNOWER.

Specification of Letters Patent No. 11,941, dated November 14, 1854.

*To all whom it may concern:*

Be it known that I, WILLIAM MOORE, of Belleville, in the county of Richland and State of Ohio, have invented a new and useful Improvement in Grain Winnowers and Separators for cleaning wheat and other grains where it is important to have it separated from all wild seeds, dirt, &c., which I call a "Grain Winnower and Separator;" and I do hereby declare that the following is a full, clear, and exact description of the construction and operation of the same, reference being had to the annexed drawings, making a part of this specification, in which—

Figure 1 is a perspective view of my winnower.

To enable others to build and use this winnower, I will describe its construction and operation.

A represents sills of the stationary frame. Into these sills I frame two posts B. To the top of these posts, I frame a piece of timber; as shown at C. At the center of this frame, I place my fan shaft in a perpendicular position; as shown at D. The fans attached to the shaft and the drum inclosing them are built in the common way; as seen at E. The drum rests on a washer at the center of the stationary frame, and made to work freely around shaft D at its center. At the top and bottom of the drum I fasten slats crossing at right angles, and projecting sufficient to receive rods extending from top to bottom as shown by G. Between those rods H, I arrange my screens on the four sides of my drum, and descending from top to bottom; as shown by I. The wind, caused by the velocity of the fans passing through apertures in said drum, operates on grain as it passes from top to bottom of the screen. My crank shaft being secured to a stationary frame as seen at J. The crank on shaft J being connected to the frame that supports my riddles by rod K. This frame is kept in motion, as shaft J is turned by a strap passing around the pulleys L and M on shaft D. The fans may be driven by any power intended to drive them. The large amount of screening that can be used by this arrangement; occupying but little space; together with the grain being acted on at four different points, gives this separator a decided advantage, over most others now in use. It takes but little power to drive it; and will not be liable to get out of order.

What I claim as my invention and desire to secure by Letters Patent is—

The arrangement of riddles around a perpendicular fan so that graian can pass over each and be acted upon at any desired point by wind from said fan as described and represented.

WM. MOORE.

Witnesses:
 E. CLARK,
 F. W. MOORE.